(12) United States Patent
Akmandor

(10) Patent No.: US 10,309,222 B2
(45) Date of Patent: Jun. 4, 2019

(54) REVOLVING OUTER BODY ROTARY VANE COMPRESSOR OR EXPANDER

(71) Applicant: Pars Makina Sanayi ve Ticaret Limited Sirketi, Ankara (TR)

(72) Inventor: Ibrahim Sinan Akmandor, Ankara (TR)

(73) Assignee: PARS MAINA SANAYI VE TICARET LIMITED SIRKETI, Ankara (TR)

( * ) Notice: Subject to any disclaimer, the term of this patent is extended or adjusted under 35 U.S.C. 154(b) by 473 days.

(21) Appl. No.: 14/933,906

(22) Filed: Nov. 5, 2015

(65) Prior Publication Data

US 2017/0130716 A1    May 11, 2017

(51) Int. Cl.
*F01C 11/00* (2006.01)
*F01C 1/32* (2006.01)
(Continued)

(52) U.S. Cl.
CPC ............ *F01C 11/002* (2013.01); *F01C 1/321* (2013.01); *F01C 1/322* (2013.01); *F01C 1/324* (2013.01); *F01C 1/328* (2013.01); *F01C 1/332* (2013.01); *F01C 1/336* (2013.01); *F01C 1/344* (2013.01); *F01C 1/356* (2013.01); *F01C 1/39* (2013.01);
(Continued)

(58) Field of Classification Search
CPC .................. F01C 1/324; F01C 1/38–46; F01C 1/321–322; F01C 1/328–336; F01C 1/344–3442; F01C 1/356–3564; F01C 11/002; F02C 3/055; F04C 18/324; F04C 18/328; F04C 18/332; F04C 18/336; F04C 18/344; F04C 18/3441; F04C 18/3442; F04C 18/356; F04C 18/3562; F04C 18/3564; F04C 18/38; F04C 18/39; F04C 18/40; F04C 18/44; F04C 18/46; F04C 23/003; F04C 23/02; F04C 29/12; F04C 29/0085
See application file for complete search history.

(56) References Cited

U.S. PATENT DOCUMENTS 1,459,637 A * 6/1923 Jules Poyet Maurice ................... F01C 1/045 418/174
4,060,342 A 11/1977 Riffe et al.
(Continued)

*Primary Examiner* — Scott J Walthour
(74) *Attorney, Agent, or Firm* — Bryant J. Keller; Kirton McConkie

(57) ABSTRACT

Some implementations of this invention relate to energy systems and more particularly to rotating componentry enabling shaft work, propulsion drive, electric power generation, jet propulsion and/or thermodynamic systems related to aerothermodynamic thrust and shaft power, waste heat recovered shaft power, ventilation, cooling, heat, pressure and/or vacuum generating devices. Some implementations pertain to the art of vane assemblies for eccentrically placed rotating partial admission compressors and expanders that may either be used together or in conjunction with other mechanical, electrical, hydraulic and/or pneumatic machineries. Some implementations further relate to fluid energy recovery mechanical devices, targeting the field of gas turbine engines, internal combustion engines, furnaces, rotary kilns, coolers and refrigeration rotary components and/or expansion nodes. Other implementations are described.

20 Claims, 11 Drawing Sheets

(51) Int. Cl.

| | | |
|---|---|---|
| *F01C 1/328* | (2006.01) | |
| *F01C 1/39* | (2006.01) | |
| *F01C 1/324* | (2006.01) | |
| *F04C 18/332* | (2006.01) | |
| *F04C 18/324* | (2006.01) | |
| *F04C 18/356* | (2006.01) | |
| *F01C 1/356* | (2006.01) | |
| *F04C 18/344* | (2006.01) | |
| *F01C 1/344* | (2006.01) | |
| *F04C 18/336* | (2006.01) | |
| *F02C 3/055* | (2006.01) | |
| *F04C 18/328* | (2006.01) | |
| *F01C 1/332* | (2006.01) | |
| *F04C 18/39* | (2006.01) | |
| *F04C 18/44* | (2006.01) | |
| *F04C 18/46* | (2006.01) | |
| *F04C 29/12* | (2006.01) | |
| *F01C 1/336* | (2006.01) | |

(52) U.S. Cl.
CPC ............ *F02C 3/055* (2013.01); *F04C 18/324* (2013.01); *F04C 18/328* (2013.01); *F04C 18/332* (2013.01); *F04C 18/336* (2013.01); *F04C 18/344* (2013.01); *F04C 18/356* (2013.01); *F04C 18/39* (2013.01); *F04C 18/44* (2013.01); *F04C 18/46* (2013.01); *F04C 29/12* (2013.01)

(56) References Cited

U.S. PATENT DOCUMENTS

| | | |
|---|---|---|
| 5,163,825 A | 11/1992 | Oetting |
| 5,188,524 A | 2/1993 | Bassine |
| 5,616,019 A | 4/1997 | Hattori et al. |
| 5,692,887 A | 12/1997 | Krueger et al. |
| 6,125,814 A | 10/2000 | Tang |
| 6,371,745 B1 | 4/2002 | Bassine |
| 6,666,671 B1 * | 12/2003 | Olver .................. F01C 21/0809 418/138 |
| 6,868,822 B1 | 3/2005 | Di Pietro |
| 7,117,841 B2 | 10/2006 | Kernes |
| 7,597,548 B2 | 10/2009 | Patterson |
| 8,579,615 B2 | 11/2013 | Akmandor |
| 2003/0159673 A1 | 8/2003 | King |
| 2009/0180911 A1 * | 7/2009 | Ooi ....................... F04C 18/332 418/64 |
| 2012/0224989 A1 * | 9/2012 | Akmandor ............. F01C 1/324 418/12 |

* cited by examiner

REVOLVING OUTER BODY ROTARY VANE COMPRESSOR OR EXPANDER

FIELD OF THE INVENTION

This invention relates to energy systems and, in some implementations, more particularly to rotating componentry enabling shaft work, propulsion drive, electric power generation, jet propulsion and thermodynamic systems related to aero thermodynamic thrust and shaft power, waste heat recovered shaft power, ventilation, cooling, heat, pressure or vacuum generating devices. In some implementations, the invention mainly pertains to the art of vane assemblies for eccentrically placed rotating partial admission compressors and expanders that may either be used together or in conjunction with other mechanical, electrical, hydraulic or pneumatic machineries. Of particular interest, in accordance with come implementations, is the innovative fluid energy recovery mechanical devices targeting the field of gas turbine engines, internal combustion engines, furnaces, rotary kilns, coolers and refrigeration rotary components and expansion nodes.

BACKGROUND

There are many pivot vane and hinged vane rotary devices such as described in US Patent and US Patent Application numbers U.S. Pat. No. 7,597,548 by Patterson, U.S. Pat. No. 7,117,841 by Kernes, U.S. Pat. No. 6,868,822 by Di Pietro, U.S. Pat. No. 6,125,814 by Tang, U.S. Pat. No. 5,692,887 by Krueger, U.S. Pat. No. 6,371,745 by Bassine, U.S. Pat. No. 5,616,019 by Hattori, U.S. Pat. No. 5,188,524 by Bassine, U.S. Pat. No. 5,163,825 by Oetting, U.S. Pat. No. 4,060,342 by Delmar, US 2003/0159673 by King, and U.S. Pat. No. 4,060,342 by Riffe; but it does not appear to Applicant that any of them exhibit a pivoting arc vane that is both hinged to a rotatable housing and the rotor as described herein. Most conventional vane rotary devices exhibit at least a few significant problems. As each vane slides back and forth within its respective slot, a considerable amount of friction, heat and wear can be generated. The sustained operation causes the vane slots to wear prematurely, leading to clearance increase and deterioration of performance. In some cases, a vane compressor and expander prevent such wear as explained in previous art [U.S. Pat. No. 8,579,615 by Akmandor].

SUMMARY

Some implementations of the invention relate to a rotatable vane (100, 126, 168, 174, 201) both hinged (98, 111, 125, 129, 192, 195, 197, 202) to a rotatable cylindrical housing (101, 134, 156, 157, 159, 161, 169, 173, 209) and a rotor (102, 139, 175, 205) placed within a cylindrical housing. Such configuration may be used either as a compressor (14, 47, 89) or an expander (4, 45, 76). In some implementations, a rotatable housing receives an eccentrically placed (106, 135, 152) rotor (102, 139, 175, 205) equipped by a single rocking arm (113, 193, 199) vane, all arranged around a fixed keyed (109) eccentric (106, 135, 152) shaft main axis (108). Between some implementations the housing and the rotor, depending on the rotational position of rotatable vane, forms a single (104,133) or a plurality of working chambers (121, 123, 143, 148, 190, 191, 203, 206, 215, 217, 218, 219) each of the chambers, delimited by inner cylindrical peripheral surface (110) of housing, the outer peripheral surface (107) of the rotor and side surfaces (120, 122) of vane.

Because some rotary vane compressors or expanders are partial admission devices, some such devices have low mass flow rate requirements and they become extremely useful when used in conjunction with well-established power systems such as gas turbine engines, internal combustion engines, inner and/or outer running electrical motors.

Some friction-free and wear-free vane mechanism resemble the reliable rolling piston type rotary vane compressors and expanders widely used in the refrigeration industry for decades. In accordance with some embodiments, the described apparatus provides an improved rotary compressor or rotary expander that has a rotatable (115, 141, 150) housing and a rotor (114, 140, 151) both linked with a durable, wear resistant, friction-free pivoting vane.

The novelty behind some implementations of such expander and compressor performance can be summarized as follows: instead of using a full admission turbine like radial or axial inflow turbines, in some implementations, a partial admission high torque rotary vane expander is used, requiring a relatively low mass flow rate throughput. In some implementations, the large flow rate turbine is replaced by an expander having one order of magnitude less mass flow rate and allowing high expansion in hermetic volume. In accordance with some implementations, a vane expander has a very efficient and robust aero thermodynamic architecture able to accept high temperature, high pressure working fluids. A vane compressor has a no-stall capability allowing to reach high pressure ratio with low mass flow throughput. Other features, advantages, and applications of the invention will be apparent from the following descriptions, the accompanying figures, and from the claims.

Some implementations of the rotary components described herein are configured to be an efficient alternative to the sliding vane turbo-rotary components of turbo-engines described in previous art [U.S. Pat. No. 7,314,035 by Akmandor and al., FIGS. 8-9-10]. Some implementations of the present invention further address some additional problems related with; a) eccentricity related low shaft torque output, b) friction between rotor and side wall, c) surface wear, d) pressure seal, e) rotor imbalance caused by eccentricity, f) rotor aerodynamic drag, and/or g) impairing caused by sudden pressure expansion at expander inlet prior to chamber expansion. Some of these weaknesses limit the performance and wide use of rotary vane compressor and expanders. Some implementations of the described claims and novel devices aim to eliminate aforementioned difficulties and increases thereafter described system performance.

BRIEF DESCRIPTION OF THE DRAWINGS

In order that the manner in which the above recited and other features and advantages of the present invention are obtained, a more particular description of the invention will be rendered by reference to specific embodiments thereof, at least one of which is illustrated in the appended drawing. Understanding that the drawing depicts only typical embodiments of the present invention and is not, therefore, to be considered as limiting the scope of the invention, the present invention will be described and explained with additional specificity and detail through the use of the accompanying drawing in which.

DETAILED DESCRIPTION OF EXEMPLARY EMBODIMENTS

Figure 1:
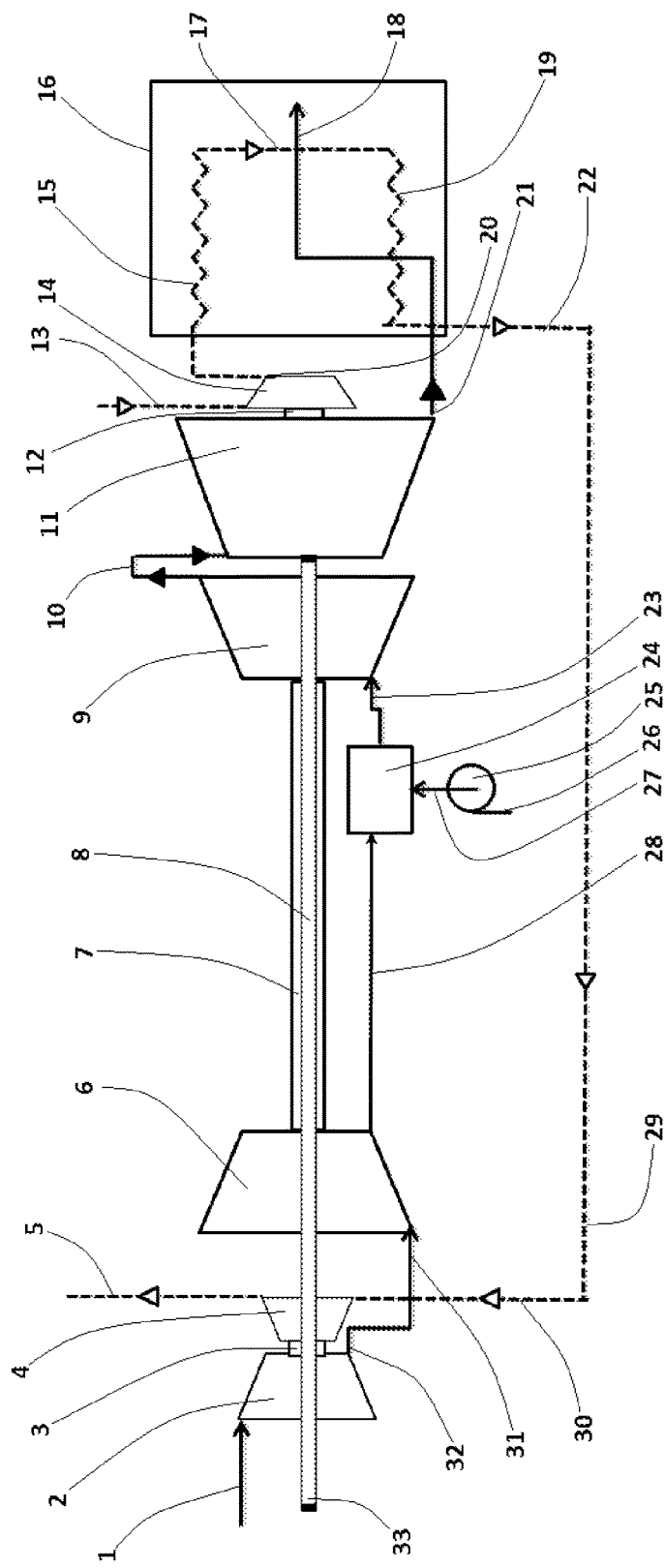
FIG. 1: Schematic view of a turboshaft or turboprop engine equipped with a waste heat recovery booster compressor system, in accordance with some embodiments.
Figure 4:
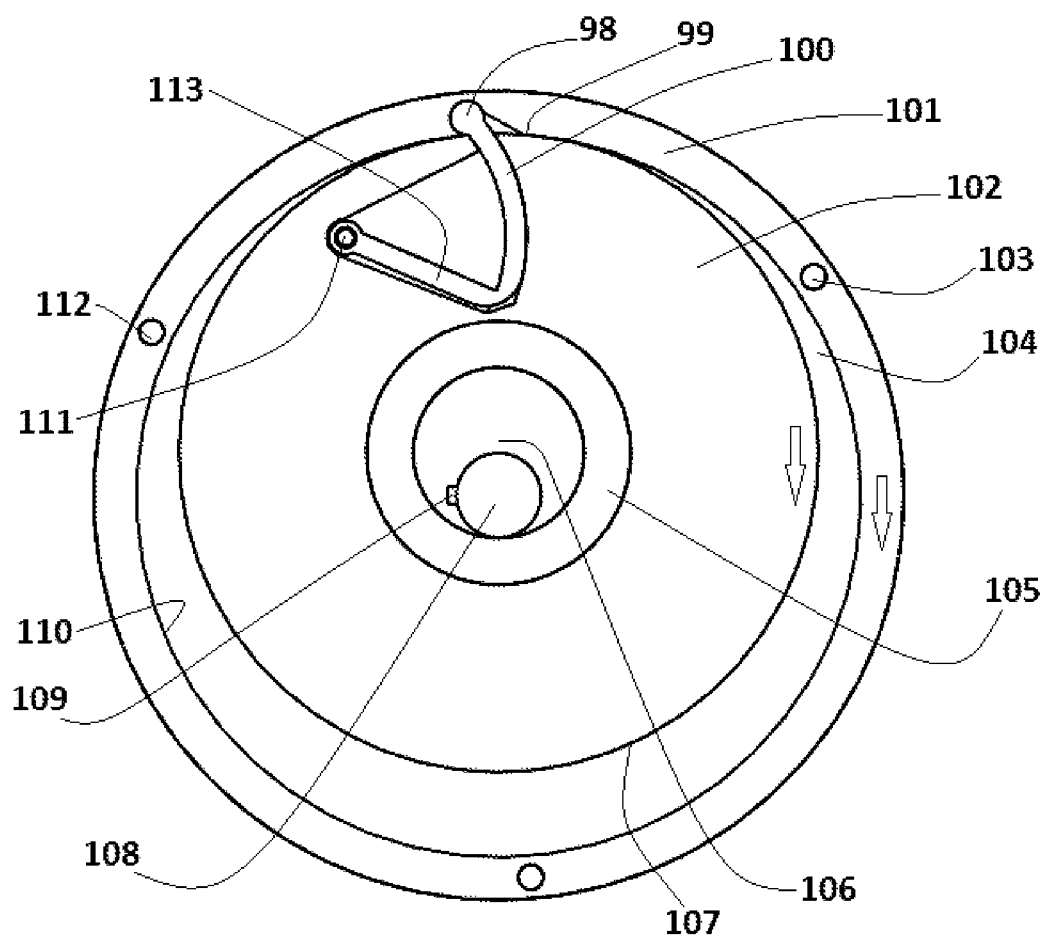
FIG. 4: Schematic view of a revolving outer body rotary vane expander, in accordance with some embodiments.
Figure 5:
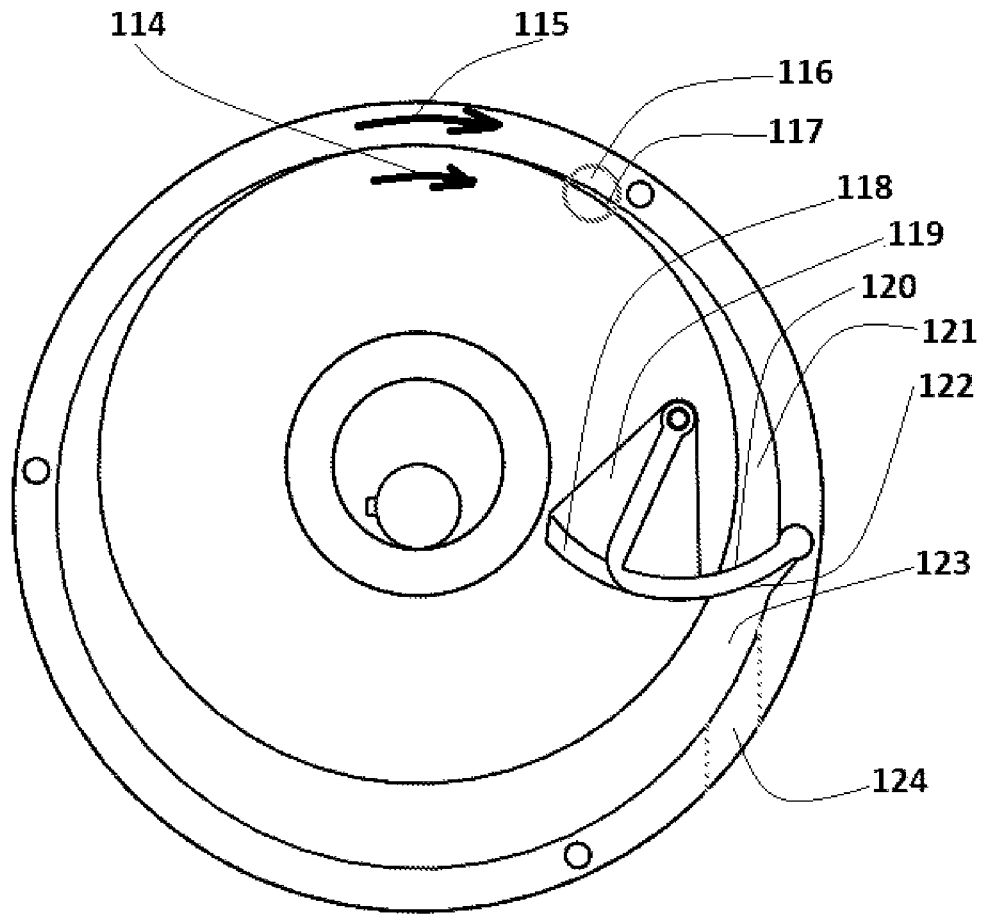
FIG. 5: Schematic view of a revolving outer body rotary vane expander equipped with inlet and outlet ports, in accordance with some embodiments.

Some embodiments of the described invention are configured to realize high compression ratios within fully hermetic compressor volumes with minimum pressure and mass flow leakage and to generate high torque in expanders following a long power extraction phase. Some embodiments are further configured to provide a vane linking a rotatable housing and a rotor eccentrically placed within housing. Some embodiments are depicted in FIGS. 4 and 5 and serve multipurpose: firstly, in accordance with some embodiments, pressure difference across vane side surfaces (120, 122) generates force and torque across working chambers (121 and 123 or 143 and 148, 190 and 206, 191 and 203, 215 and 219, 217 and 218). Secondly, in accordance with some embodiments, vane is acting as driving linkage between rotatable housing (115, 141, 150) and an eccentrically housed rotor (114, 140, 151). The above and other distinctive novel features of some embodiments of the present invention will be apparent from the following detailed description of specific embodiments of the apparatus when read in conjunction with the accompanying drawings, wherein:

FIG. 1 depicts schematic view of a representative embodiment of a turboshaft or turboprop engine equipped with a waste heat recovery booster compressor system. In accordance with some embodiments, a turboprop or turboshaft engine comprises compressor (6), combustor (24), high pressure turbine (9), low pressure turbine (11) and exhaust (16). In some embodiments, fuel (26) is pumped (25) to (27) combustor (24) to burn with main airflow. Specifically, in some embodiments, main airflow path is traced through numbered arrows (1, 32, 31, 28, 23, 10, 21, 18). In some cases, the high pressure spool compressor (6) and turbine (9) are connected by shaft (7). The turboprop or turboshaft loads are connected, in some embodiments, at low pressure shaft (8) end (33). To increase both shaft power output and thermal efficiency, a waste heat recovered booster compressor system is added to some embodiments of the system. In some embodiments, the majority of the exhaust waste heat is not absorbed by the engine main flow (1, 32, 31, 28, 23, 10, 21, 18) but by a secondary stream (13, 20, 15, 17, 19, 22, 29, 30, 5) with a much smaller mass flow rate. In some cases, the two flow streams do not mix with each other. Additionally, in some embodiments, the secondary novel flow stream (13, 15, 17, 19, 22, 29, 30, 5) is first pressurized by rotary compressor (14) driven (12) by low pressure turbine (11). Moreover, in some embodiments, secondary stream is heated up while flowing through compact once-through spiral exhaust heat exchanger (15, 17, 19). There, exhaust waste heat of main flow (18) is substantially recovered and high temperature, high pressure secondary flow thereafter expands through a rotary turbine (4) that assists to drive (3) main flow booster compressor (2).

Figure 2:
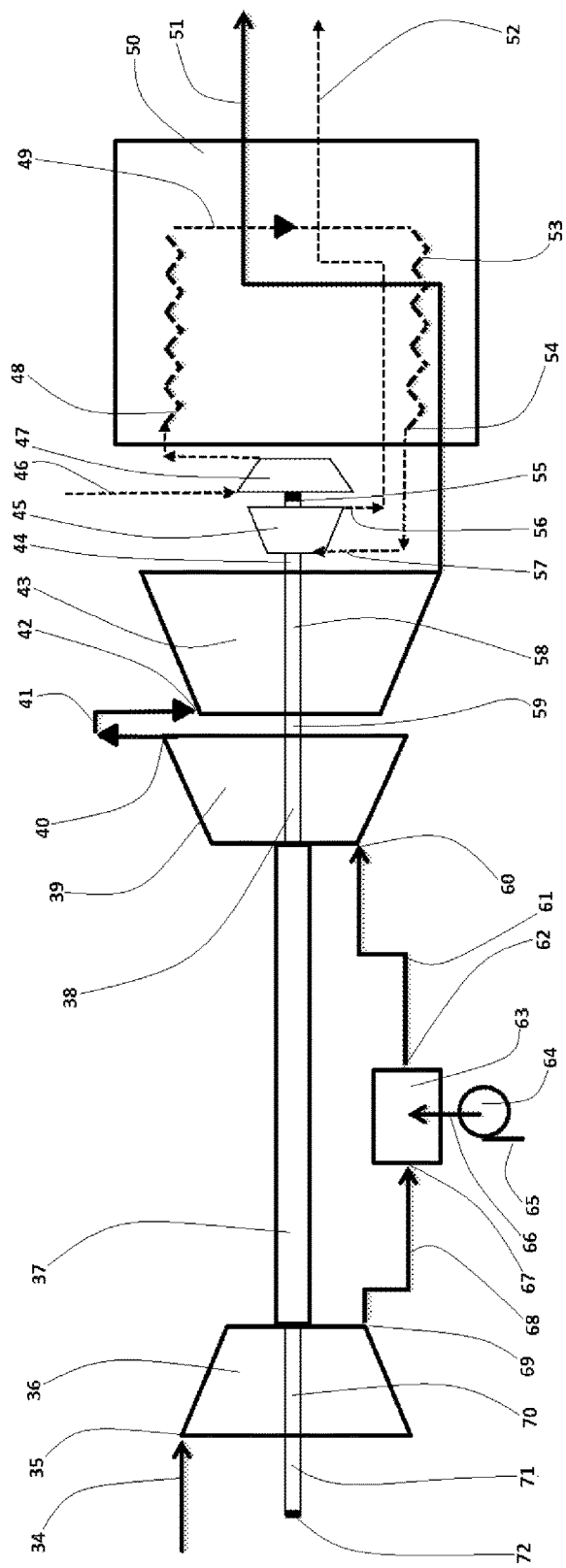
FIG. 2: Schematic view of a turboshaft or turboprop engine equipped with a waste heat recovery shaft power assist system, in accordance with some embodiments.

FIG. 2 depicts schematic view of a representative embodiment of a turboshaft or turboprop engine equipped with a waste heat recovery shaft power assist system. In accordance with some embodiments, a turboprop or turboshaft engine comprises compressor (36), combustor (63), high pressure turbine (39), low pressure turbine (43) and exhaust (50). In accordance with some embodiments, fuel (65) is pumped (64) to (66) combustor (63) to burn with main airflow. In some such embodiments, main airflow path is traced through numbered arrows (34, 35, 69, 68, 67, 62, 61, 60, 40, 41, 42, 51). Additionally, in some embodiments, high pressure spool compressor (36) and turbine (39) are connected by shaft (37). Turboprop or turboshaft engines load is connected, in some embodiments, at low pressure shaft (71, 70, 38, 59, 58) end (72). To increase both shaft power output and thermal efficiency, in some embodiments, a waste heat recovered shaft power assist system is added. In some embodiments, the exhaust waste heat is absorbed by a secondary stream (46, 48, 49, 53, 54, 57, 56, 52) having a much smaller mass flow rate. In some embodiments, the two flow streams do not mix. In some embodiments, secondary novel flow stream is first pressurized by rotary compressor (47) and is heated up while flowing through compact once-through spiral exhaust heat exchanger (48, 49, 53, 54). There, in some embodiments, exhaust waste heat of main flow (51) is recovered and high temperature, high pressure secondary flow thereafter expands through a rotary turbine (45). Furthermore, in some embodiments, generated rotary turbine power assists in driving the load through extended shaft (55, 44). Waste heat recovered turboprop or turboshaft engine is safer and more reliable as shaft power is produced through two separate air streams (primary stream: 34, 69, 68, 67, 62, 61, 60, 40, 41, 42, 51 and secondary stream: 46, 48, 49, 53, 54, 57, 52). At off design phases of flight like aircraft climb and acceleration phases, exhaust (50) heat is typically higher, and contrary to some conventional turboprop engines, the shown novelty of some embodiments will continue to provide a unique and reliable near "design-point" (cruise phase) high shaft power output. Waste heat secondary air stream, when subjected to higher elevated exhaust temperatures, generates higher power. Thus, in some embodiments, contribution of waste heat secondary stream is higher when more power is demanded by aircraft. No-stall characteristic of closed volume vane compressor and turbine also supports depicted engine performance. If additional fuel line (78), pump (77) and initial spark ignition (SI) system (79) is provided to rotary turbine (45, 76), it is possible, in accordance with some embodiments, to directly power boost the power shaft (72, 71, 70, 38, 59, 58, 44, 55) by using the rotary compressor (46) and the rotary turbine (45) as an efficient provisionary alternative small engine. This alone can increase the safety and reliability of a conventional turboprop and/or turboshaft engine.

Figure 3:
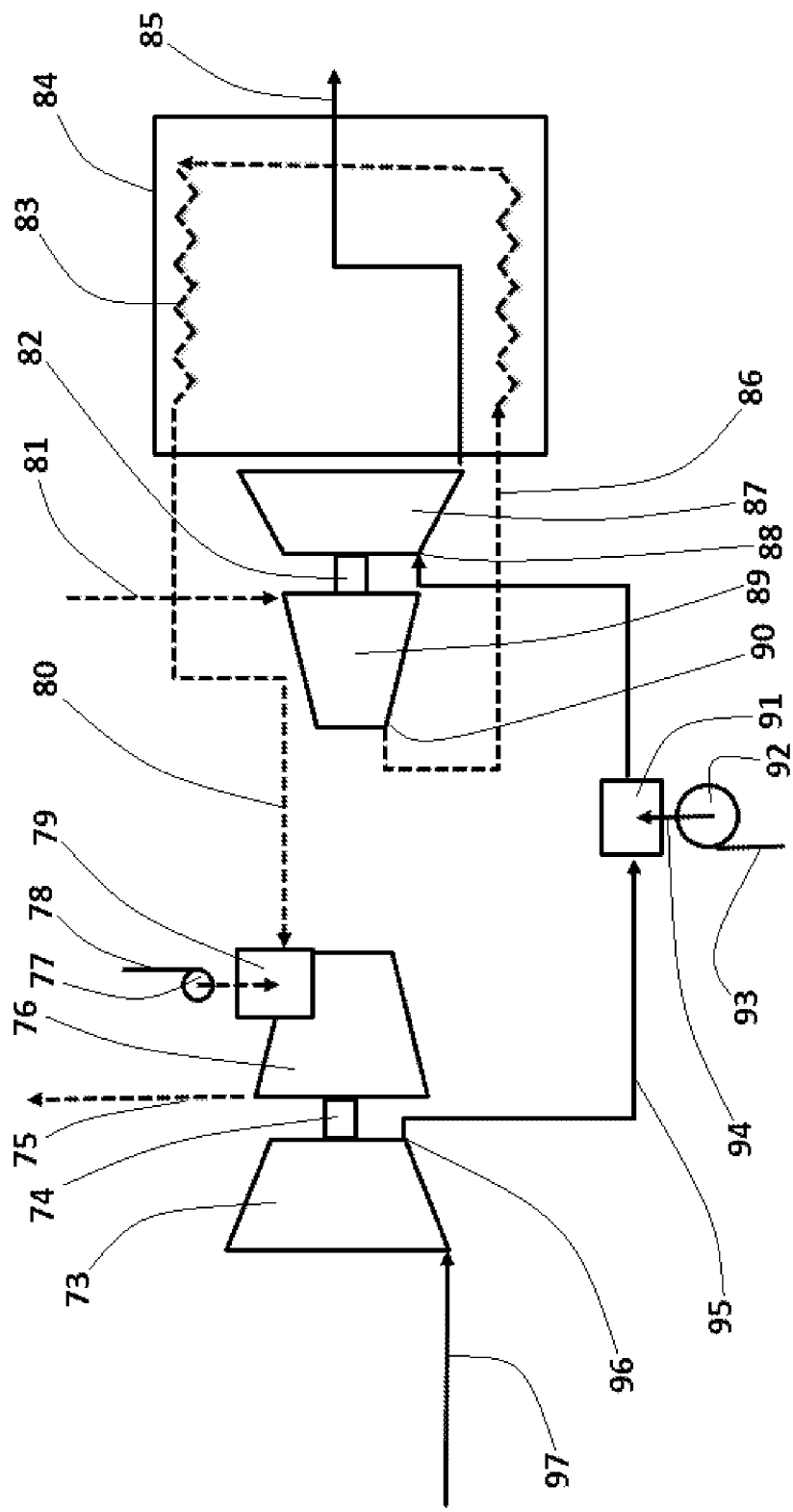
FIG. 3: Schematic view of a waste heat recuperated turbo-rotary compound engine, in accordance with some embodiments.

FIG. 3 depicts a different representative embodiment representing a schematic view of a waste heat recuperated turbo-rotary compound engine. In accordance with some embodiments, the main flow streams through the turbo components and is traced through numbered arrows (97, 96, 95, 88, 85). In some embodiments, a separate secondary flow streams through rotary components and is traced through numbered arrows (81, 90, 86, 83, 80, 75). In some such embodiments, both streams never meet and mix. Main airflow is pressurized by compressor (73) and is mixed and burned with fuel (93) pumped (92) into (94) combustion chamber (91). In some embodiment, hot main flue gas is expanded by turbine (87) and generated power drive (82) a rotary compressor (89). In some embodiments, rotary compressor pressurizes secondary air stream that is heated up while flowing through compact once-through spiral exhaust heat exchanger (83). In some embodiments, exhaust (84) waste heat of main flow (85) is recovered. High temperature, high pressure secondary flow thereafter expands through a rotary turbine (76). As an option, the secondary flow may receive fuel (78) pumped (77) into rotary turbine combustor (79). Secondary flow and fuel mix burns inside some embodiments of combustor (79) and/or inside the rotary expander (76). In some embodiments, generated power drives (74) main flow compressor (73). This turbo-rotary jet engine has superior performance compared to some conventional turbojet engines as some of its embodiments have better stall margin, high thrust power and/or high thermal efficiency. Some embodiments of rotary compressor (89) require about 30% less power when compared to some conventional axial or radial compressors and more turbine (87), and, in some embodiments, power is left for producing exhaust (84) thrust. Some embodiments of rotary turbine (76) can operate at higher inlet pressures and temperatures with regards to some conventional axial or radial turbines. Accordingly, in some instances, secondary stream is proportionally smaller and rotary components (89, 76) are more compact and lighter.

FIG. 4: depicts top view of a representative embodiment of a revolving outer body rotary vane expander. In accordance with some embodiments, cylindrical rotor (102) is rotatable and eccentrically mounted within a rotatable housing (101). In some such embodiments, a rotor (102) is rotating around its axis center (106) and a rotatable housing (101) is rotating around its axis center (108). In some embodiments, the circumferential speeds along rotor outer diameter and along a rotatable housing inner diameter is same at common tangency point (99). At this circumferential position, a vane (100) is shown to be fully retracted within rotor housing. In some embodiments, rotor axis (106) and rotatable housing axis (108) are fixed, allowing any lubrication and cooling lines (not shown) to be brought to rotor bearing (105, 131, 211) and rotatable housing bearings (165). In accordance with some embodiments, a vane (100) is pivoting around pivot rod (111) secured to the rotor. In shown time snapshot, only one crescent shape chamber (104) is formed. Fluid is filling this crescent shape cavity. Fluid is either air, or any other working gas or vapor, or any other liquid-vapor mixture. In some embodiments, rotatable side plates (166, 170, 172, 176) are securely bolted (or otherwise connected) to a rotatable housing (101) via bolt holes (103, 112) (and/or another suitable mechanism) providing a hermetic enclosure with leaks.

FIG. 5 depicts a different time snapshot of same embodiment shown in FIG. 4 for some embodiments of a revolving outer body rotary vane expander equipped with non-revolving inlet (116) and rotatable outlet (124) ports. In accordance with some embodiments, as a vane (100) cuts through a crescent-shape working volume, a plurality of working chambers (123, 121) are sequentially created within a crescent shaped cavity (104) delimited by a rotor outer cylindrical surface (107), a rotatable housing inner cylindrical peripheral (110) and vane arched side surfaces (120, 122). In some embodiments, first working chamber (121) accepts high pressure working fluid that enters through intersecting area of non-revolving inlet port (116) and portion (117) of crescent shape revolving chamber. In some embodiments, pressure difference between working chambers (121 and 123) creates a pushing force acting on exposed vane surface. Exhaust port (124) of such rotary expander is, in some embodiments, continuously allowing expanded low pressure flow to discharge. While rotatable housing (115) and rotor (114) are revolving around their respective centers (108 and 106), the vane is, in some embodiments, performing a swinging arc motion with arm (113) extending from hinge (111) and sweeping area (119) within rotor. In some such embodiments, vane moves tangentially to arc slot (118) boundary with little to no friction.

In accordance with some embodiments, a rotary compressor unit is similar in component to the expander unit but the rotational direction and the inlet and exit port are reversed. Indeed, in some embodiments, expander has a clockwise rotation and non-revolving port (116) is fluid inlet and revolving port (124) is fluid exit. For compressor operation, in some embodiments, rotation is counterclockwise and ports are interchanged: now, revolving port (124) is fluid inlet and port (116) is fluid exit.

Figure 6:
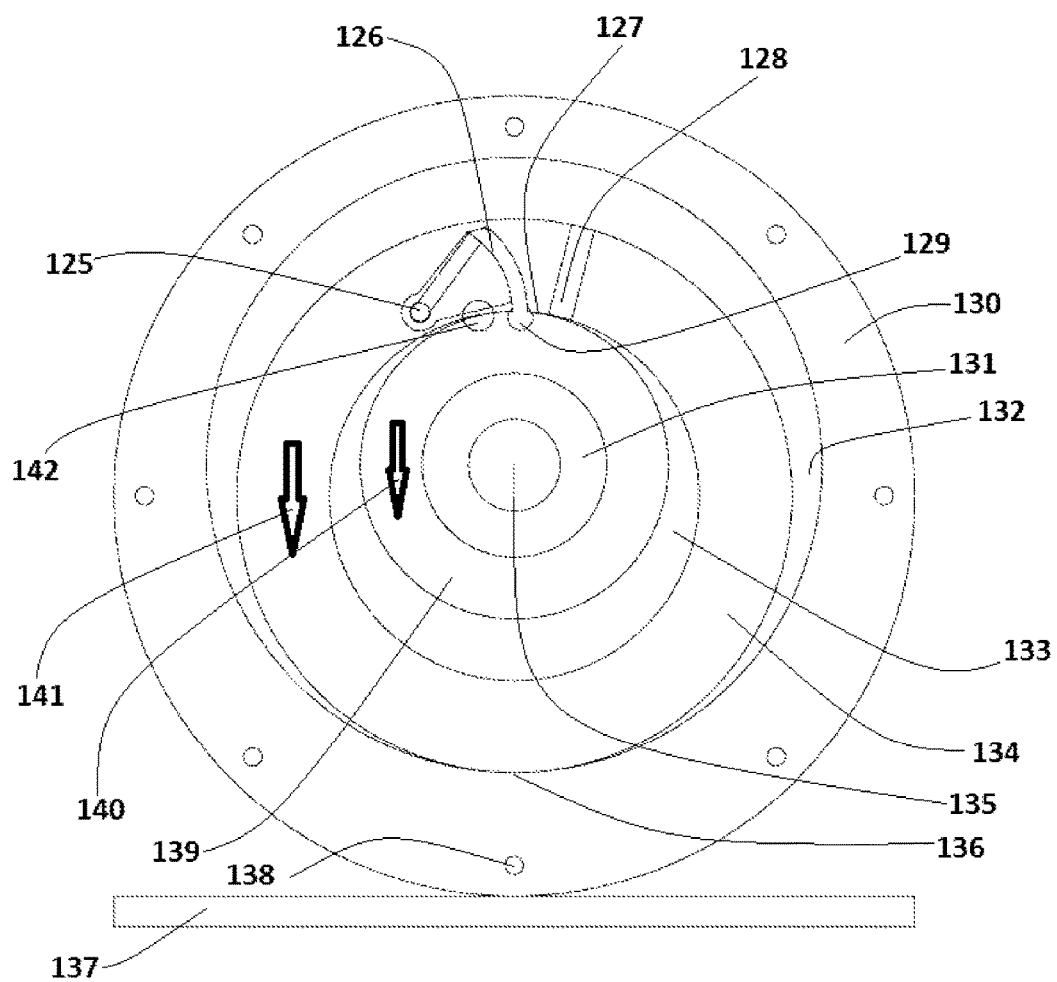
FIG. 6: Schematic view of a counter-revolving outer body rotary vane compressor at beginning of compression process, in accordance with some embodiments.

FIG. 6 depicts a representative embodiment of counter-revolving outer body rotary vane compressor. In this figure, both rotatable housing (134) and rotor (139) revolves counterclockwise (141 and 140, respectively). Time snapshot at beginning of compression process is shown. Rotor is housed within a rotatable cylindrical housing also rotating counterclockwise (141) around fixed center (149). A vane (126), in this illustration, is rigidly connected to the pivoting rod (125) through arm (113). A vane (126), in this figure, engages across its entire height (198) inside a rotatable housing (134). A vane is assembled and hinged (125) to rotatable housing and also (129) mounted to rotor (139). The extent of tangency of the vane-rotor articulation (129) covers a circular arc in excess of 181° (or any other suitable angle), vane hinge cannot disengage from rotor cylindrical cavity (167) during working operation of the unit. In some embodiments, the two hinged ends (125 and 129) of a vane are contoured and positioned in a way to allow pivoting motion of the vane during 360° rotation of rotor (139) and rotatable housing (134). In some embodiments, the angular speeds of rotatable housing and rotor are different but since there is a small clearance at a common tangency point (127) of two osculating surfaces, namely rotor outer cylindrical boundary (107) and rotatable housing cylindrical inner peripheral (110), there is little to no shear friction. In some embodiments, a crescent shape volume (133) is filled through fluid entering from inlet port (128) from outside volume (132). In some embodiments, a periodic sequence of compressed fluid is discharged from an outlet port (142) with each rotation of rotor and rotatable housing in response to input driving torque and circumferential speed of main rotor shaft. In some embodiments, the rotor axis center (135) is fixed to outer casing (130), casing is also fixed to horizontal frame (137). In some such embodiments, there are circumferentially 8 bolt (or other fastener) holes (138) on the outer casing fixing compressor modules together. In accordance with some embodiments, rotor (139) is equipped with a bearing (131) centered at fixed center (135). Additionally, in some embodiments, clearance (136) is left between rotor outer circumferential radius (107) and fixed outer casing (130).

Figure 7:
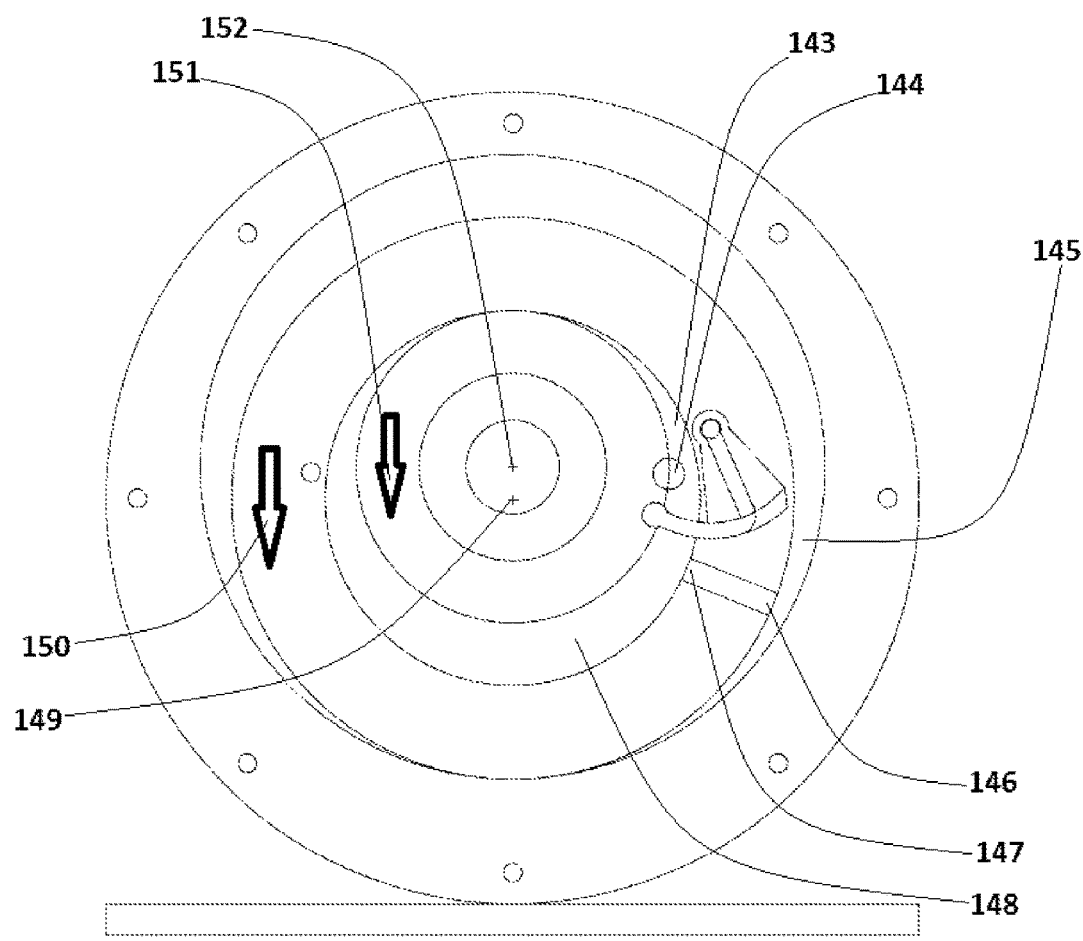
FIG. 7: Schematic view of a counter-revolving outer body rotary vane compressor towards an end of a compression process, in accordance with some embodiments.

FIG. 7 depicts the same embodiment illustrated in FIG. 6 at a different time snapshot. A counter-revolving outer body rotary vane compressor is depicted here, in accordance with some embodiments, towards the end of compression process. In this figure, rotor is rotating counterclockwise (151) around its fixed center (152) which is eccentrically displaced from rotatable housing fixed center (149). As rotatable housing is, in some embodiments, driven counterclockwise by an external motor—not shown—the rotary compressor breathes from external source (145) through the rotatable intake (146). First working chamber (148) is receiving the fluid from rotatable intake port (147), fluid is either air, or any other working gas or vapor, or any other liquid-vapor mixture. As a vane (126) cuts, in some embodiments, through a crescent-shape working volume (133), a plurality of working chambers (148, 143) are sequentially created within a crescent shaped cavity. In some such embodiments, the first working chamber (148) accepts low pressure working fluid and the second working chamber (143) compresses the working fluid which was admitted within the housing by the first chamber (148) in the precedent 360° rotation of housing and rotor. Fluid is, in some embodiments, compressed by a continuously diminishing chamber working volume (143) discharging to outlet port (144). In some cases, exhaust port (144) of such rotary compressor is equipped with a check valve or a rotating valve—not shown—that allows flow to discharge from rotary compressor device but strictly prevents any flow intake from exhaust port (144). In some embodiments, the rotary expander unit is similar in component to the compressor unit but its geometric size is different and the direction of rotation is now clockwise. In some embodiments, the ports are also interchanged: inlet port is (144) and exit port is (147). With the beginning of a new working cycle, some embodiments of the first working chamber (143) admit high pressure fluid from inlet port (144) and the working fluid expands in chamber (143) as the rotor (139) and rotatable housing (134) revolve under the forcing torque and pressure of admitted fluid. In the consecutive 360° clockwise rotation which defines the second working cycle, the fully expanded working fluid which is now in the second working chamber (148) discharges, in some embodiments, through rotatable exhaust port (147). In some embodiments, under the rotational action of rotor and rotatable housing, the working chambers (143, 148) continuously change size and volume. The expansion pressure ratio of expander is dependent on working fluid inlet pressure, the amount of the mass flow through expander and the maximum crescent shape volume of expander unit.

Figure 8C:
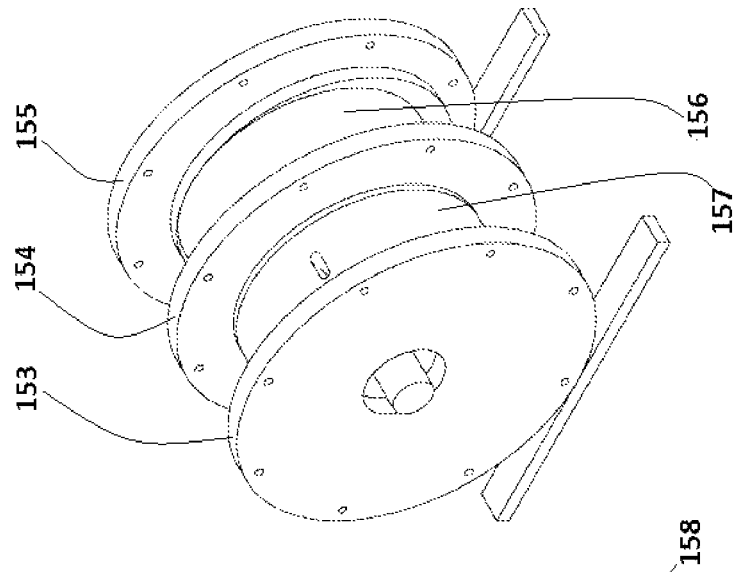
FIGS. 8A-8C: Schematic view of a side, front and perspective views of a fully balanced, twin, counter-revolving outer body rotary vane compressor, in accordance with some embodiments.
Figure 8B:
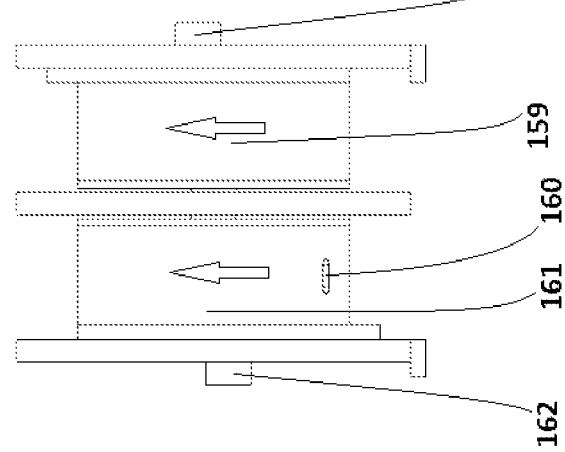
Figure 8A:
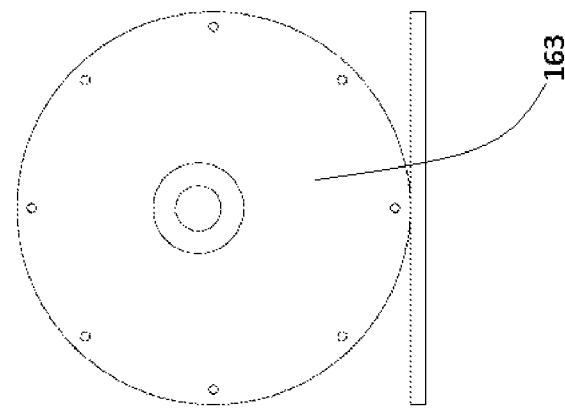

FIGS. 8A-8C depict representative embodiments of side, front and perspective views of fully balanced, twin, counter-revolving outer body rotary vane compressor. In some embodiments, there are two revolving units (159, 161) working symmetrically with respect to rotatable housing center. In some such embodiments, all components in the second unit (159, 156) are displaced by 180° out of phase to respective components of first unit (161, 157). As such, in some embodiments, the inlet port of second unit is placed at about 180° out of phase from inlet port (160) of first unit (161, 157). Rotor bearing housings for first and second compressor unit are denoted by (162, 158) respectively and their eccentricity, in accordance with some embodiments, is also shown to be about 180° out of phase (162, 158) with respect to each other. The fixed non-rotating components are housing plates (163, 153, 154 and 155).

Figure 9:
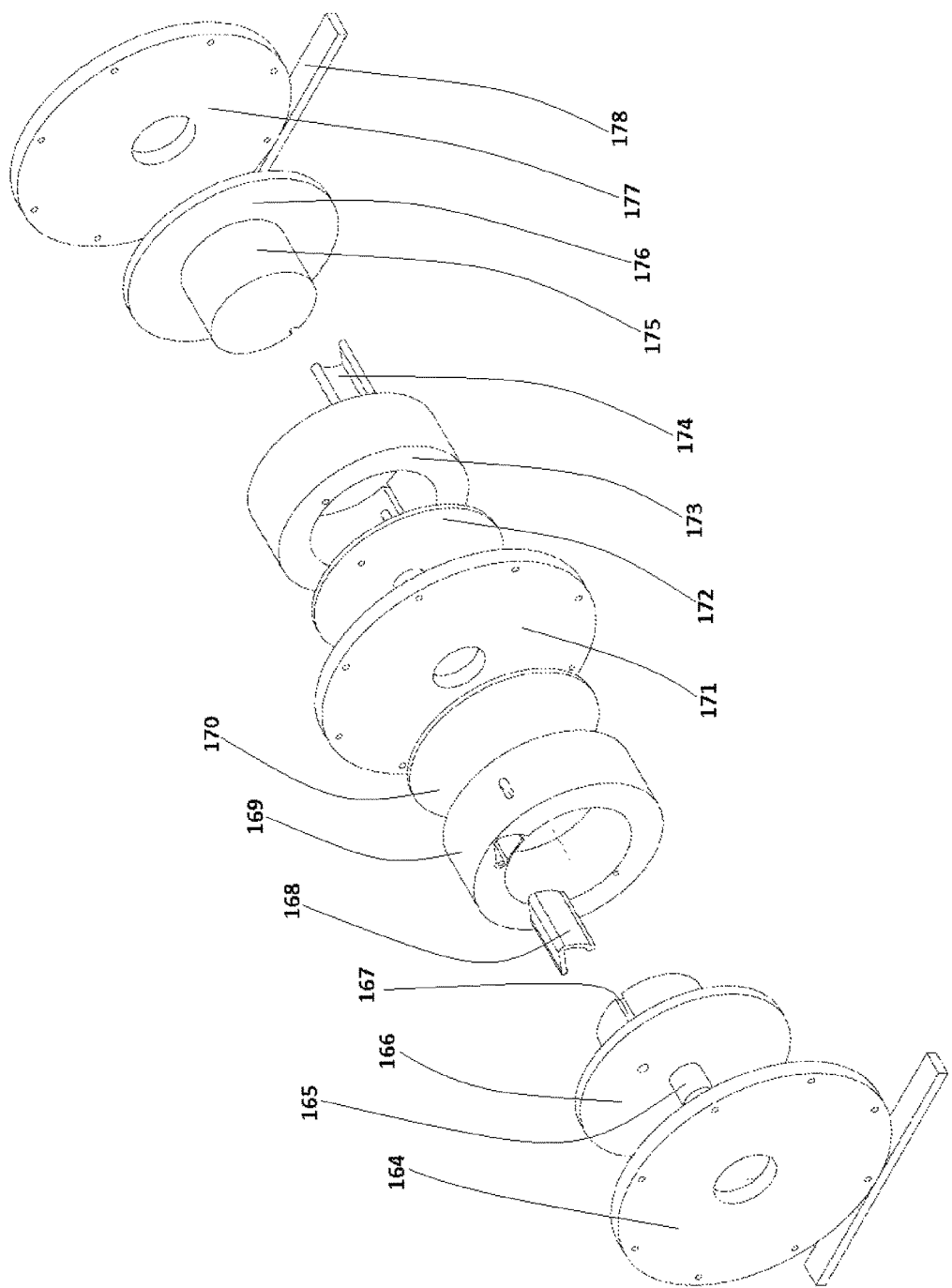
FIG. 9: Exploded view of fully balanced, twin, counter-revolving outer body rotary vane compressor, in accordance with some embodiments.

FIG. 9 shows an exploded view of the same embodiment in FIGS. 8A-8C. In FIGS. 8A-9, the circumferential position of the vanes (168, 174) are illustrated as being about 180° out of phase with each other as well as the rotatable housings (169, 173) and the rotor (175) with hinge groove (167). In some embodiments, the rotatable side plates (166, 170, 172, 176) hermetically close the compressor working chambers, thus substantially, if not completely, eliminating leakage. In some embodiments, at rotor shaft end, bearings (165, 162, 158) and lubrication means (not shown) allow rotor rotation with minimum friction. In some such embodiments, bearings (165, 162, 158) are supported on their outside diameter by outer fixed side plates (164, 171, 177) that are rigidly connected to horizontal fixed reference support (178).

Figure 10:
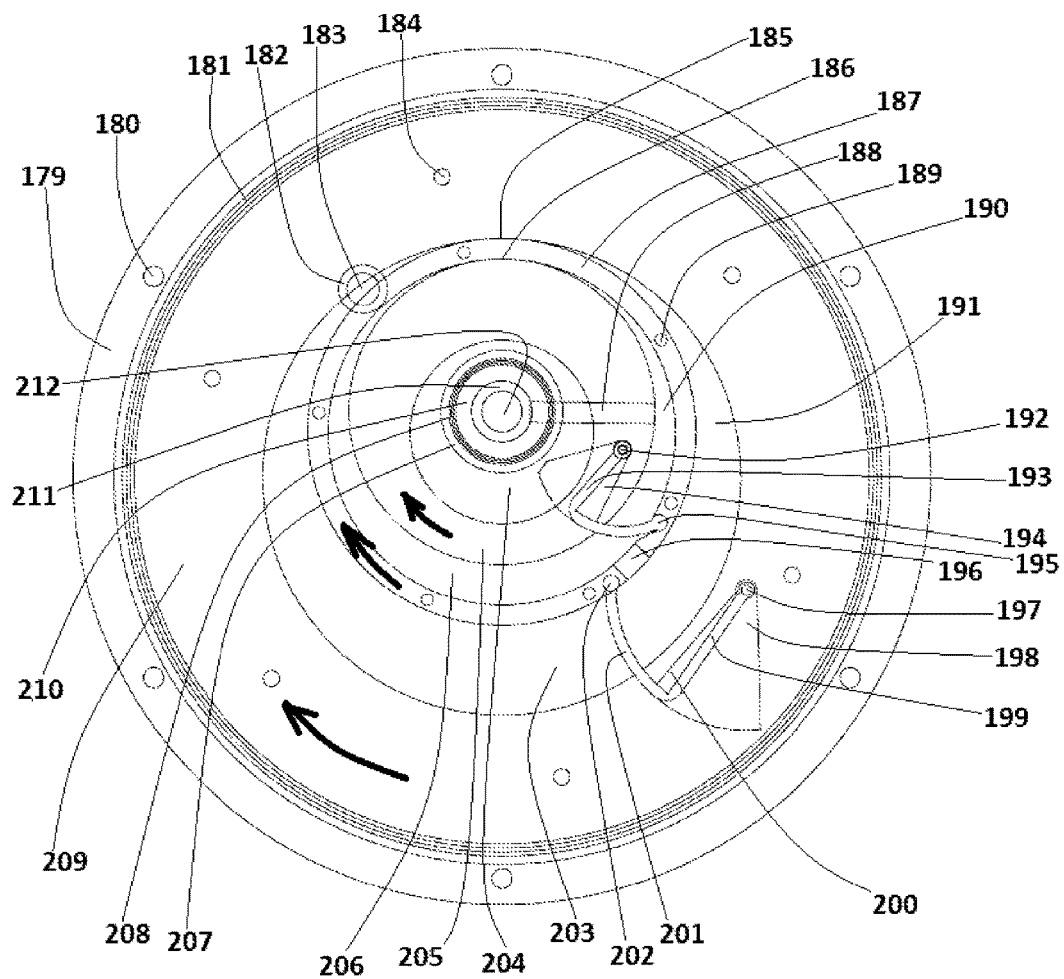
FIG. 10: Schematic view of a continuous flow revolving outer body rotary expander with two radially nested vanes operating in series (first quarter expansion already past), in accordance with some embodiments.

FIG. 10 depicts a representative embodiment of a continuous flow revolving outer body rotary expander with two radially nested vanes (inner: 193, outer: 201) systems operating in series. In some embodiments, pressurized fluid enters continuously through rotor fixed center (212). In accordance with some embodiments, the clockwise revolving rotor (205) is eccentrically (204) displaced from rotatable middle cylindrical ring (187) in such a way that the rotor (205) is always in tangent to the cylindrical ring (187) at osculating common surface tangency point (186). In some embodiments, the labyrinth concentric circle seals (208) prevent pressurized working fluid contained in the hollow fixed main shaft center from leaking. Rotor bearings (211) and rotor bearing housing (207, 210) are mounted, in some embodiments, around fixed center (212). Additionally, in some embodiments, an inner vane (193) is sealing and extending from rotor slot (194) and is hinged (192) both to rotor and middle cylindrical ring (195) to divide a crescent shape volume into two consecutive inner working chambers (190, 206). In some embodiments, the working fluid continuously enters first working chamber (190) through radial connection channel (188). This channel can take any other cross sectional shape so as to decrease aero thermodynamic total pressure loss and increase fluid kinetic energy along channel. In some embodiments, an outer vane (201) is sealing and extending from rotatable housing slot (198, 200) and is hinged (202, 197) to middle cylindrical ring (187) and rotatable outer housing (209) to divide a crescent shape volume into two consecutive outer working chambers (191, 203). In accordance with some embodiments, pressure in first working chamber (190) is higher or equal to pressure in second working chamber (206) as this second chamber discharge pressurized fluid to third working chamber (191) through connection port (196). This connection port can be an aerodynamic port with convergent and/or divergent profiling contours so as to minimize total pressure loss and increase fluid kinetic energy. In some embodiments, the third working chamber (191) is located at a higher radius where expansion against an outer vane (201) occurs. In some embodiments, pressure in the fourth and last working chamber (203) is at a low reference level as working chamber exit port (182) is regularly or always open. Reference low level pressure may be atmospheric as it is the case for an open thermodynamic cycle or any fixed low value in a closed thermodynamic cycle such as found in organic Rankine cycles or Rankine cycles. In some embodiments, the osculating common tangency point between rotatable housing (209) and rotatable middle ring (187) has a fixed position (185) and does not circumferentially change with time. In some embodiments, the fourth working chamber (203) intersects (183) at all time with exit port (182) allowing this working chamber to always stay at low reference pressure. Radially placed inner and outer vanes (193, 201), in accordance with some embodiments, are moving along their respective circular arc path (118). In some embodiments, vanes each have a pivot axis (192, 197) respectively fixed to rotor (205) and rotatable housing body (209). Pivoting arm (199) operating inside a cavity (198, 200) in response to the 360° rotations of outer housing (209), middle ring (187) and rotor (205). In some such embodiments, common tangency points (185, 186) are on top of each other. In other embodiments, however, this may not be the case. Bolt (or other fastener) holes (189, 184) on rotatable middle ring (187) and on rotatable outer housing (209) allow some embodiments of the side plates (not shown) to hermetically seal inner and outer working chambers so as to avoid any fluid leakage to outside. In some embodiments, concentric labyrinth seals (181) also help prevent such leaks. Rotor (205), rotatable middle ring (187) and rotatable outer housing (209) have, in some embodiments, different angular speeds and it is still possible to hermetically seal components and associated vanes (193, 201) with a multitude of concentric, leak-proof fixed and rotatable side plates (166, 170, 172, 177) separately bolted through indicated holes (184,189) to components (205, 187, 209). In another embodiment, it is also possible to hermetically seal rotor (205), rotatable middle ring (187) and rotatable outer housing (209) and associated vanes (193, 201) with a single side plate bolted using circumferentially distributed bolt (or other fastener) holes (184). Fluid leaks from side plates surfaces are prevented, in some embodiments, using concentric circumferential labyrinth seals. Rotatable housing (209) may also be fully enclosed with a fixed circumferential housing (179) bolted through holes (180) to fixed side plates (164, 171, 177).

Figure 11:
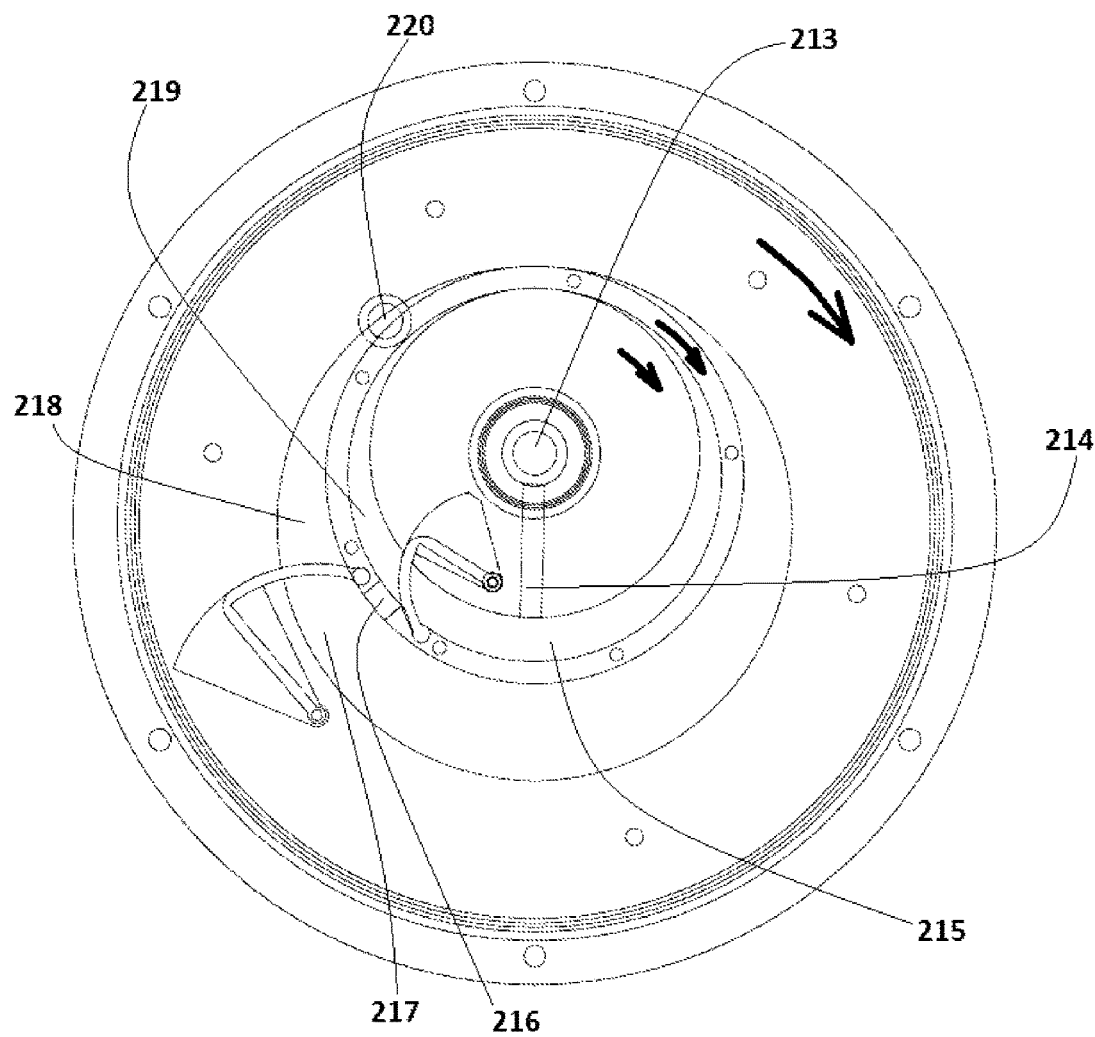
FIG. 11: Schematic view of a continuous flow revolving outer body rotary expander with two radially nested vanes operating in series (third quarter expansion about to be completed), in accordance with some embodiments.

FIG. 11 depicts a time snapshot of a representative embodiments showing a continuous flow revolving outer body (209) rotary expander with two radially nested vanes (193, 202) operating in series. This is the same expander depicted in FIG. 10 but shown at a different time frame where three-quarter of total volume (217 and 219) expansion is about to be completed. In some embodiments, the inner system is mainly composed of a rotor (205), a rotatable middle ring (187) and a vane (193) movably connected to respective rotatable components (205, 187). This inner system receives, in some embodiments, continuous fluid flow through fixed inlet tube (213) and passes on to the first working chamber (215) via a continuous fluid transfer tubing (214). The role of an inner vane (193) is to partition this incoming fluid into sequential batches of working volume (215, 219). In some embodiments, the partitioning is achieved each time an inner vane (193) pivot point (195) revolves and crosses a common fixed tangency point (186). The first working chamber (215) pressure is higher or equal to second working chamber (219) pressure. Thus, in some embodiments, inner system forces an inner vane to rotate clockwise at virtually all times of operation. Torque and power performance belongs to inner system and is entitled as power torque phase. In some embodiments, working fluid in second working chamber (219) then crosses into third working chamber (217) through a transfer port (216) situated between second and third working chambers (219, 217). There, working volumes (219, 216 and 217) expands all together until the fluid passage (216) is tangent to osculating common tangency point (186). Although total expanding volume (219, 216, 217) is getting larger, pressure of third working volume (217) is, in some embodiments, larger than pressure of fourth working volume (218) as volume is always open to atmosphere via exit port (220). As working fluid expands, pressure difference across an outer vane (201) forces rotatable components to rotate as well. Namely, an outer vane (201) forces the outer rotatable housing (209) to rotate, also forcing the rotatable middle ring (187) to revolve around its own fixed center.

Other embodiments will occur to those skilled in the art and are within the following claims:

1. A rotary expander, comprising:
    a cylindrical rotatable housing with a cylindrical inner chamber that is defined by an inner cylindrical surface of the cylindrical rotatable housing;
    a cylindrical rotor that is placed within the cylindrical inner chamber and mounted eccentrically with respect to a center axis of the cylindrical rotatable housing, wherein the cylindrical rotor includes an outer cylindrical surface;
    a crescent shaped working volume that is formed between the inner cylindrical surface of the cylindrical rotatable housing and the outer cylindrical surface of the cylindrical rotor; and
    a vane assembly, comprising one of the following:
        (i) a rocking arm connected to a circularly-arced portion, wherein the rocking arm is pivotally mounted via a first hinge to the cylindrical rotor and wherein the circularly-arced portion is pivotally mounted via a second hinge to the cylindrical rotatable housing, wherein the circularly-arced portion is configured to extend sealingly from a slot in the cylindrical rotor to periodically divide the crescent shaped working volume into a first working chamber and a second working chamber, wherein the cylindrical rotor is mounted within the cylindrical rotatable housing such that the outer cylindrical surface of the cylindrical rotor is always sealingly engaged with the inner cylindrical surface of the cylindrical rotatable housing at a common tangency point, or
        (ii) a rocking arm connected to a circularly-arced portion, wherein the rocking arm is pivotally mounted via a first hinge to the cylindrical rotatable housing and wherein the circularly-arced portion is pivotally mounted via a second hinge to the cylindrical rotor, wherein the circularly-arced portion is configured to extend sealingly from a slot in the cylindrical rotatable housing to periodically divide the crescent shaped working volume into a first working chamber and a second working chamber, wherein the cylindrical rotor is mounted within the cylindrical rotatable housing such that the outer cylindrical surface of the cylindrical rotor is always sealingly engaged with the inner cylindrical surface of the cylindrical rotatable housing at a common tangency point;
    wherein the first working chamber is delimited by the outer cylindrical surface of the cylindrical rotor, the inner cylindrical surface of the cylindrical rotatable housing, and a first side surface of the circularly-arced portion and the second working chamber is delimited by the outer cylindrical surface of the cylindrical rotor, the inner cylindrical surface of the cylindrical rotatable housing, and a second side surface of the circularly-arced portion.

2. The rotary expander of claim 1, wherein at most two working chambers, consisting of the first working chamber and the second working chamber, are periodically formed depending on a position of the circularly-arced portion with respect to the crescent shaped working volume.

3. The rotary expander of claim 1, further comprising an inlet port and an exhaust port for regulating an admission time and duration of working fluid in the rotary expander to thereby prevent the working fluid from bypassing the crescent shape working volume and shortcutting the inlet and exhaust ports.

4. The rotary expander of claim 3, wherein the inlet port is formed in the cylindrical rotatable housing for admitting working fluid into the first working chamber.

5. The rotary expander of claim 3, wherein a first working cycle is defined over a first 360° clockwise or counterclockwise rotation of the cylindrical rotatable housing, the first working cycle beginning when the circularly-arced portion crosses the common tangency point, and a second working cycle is defined by a second 360° clockwise or counterclockwise rotation of the cylindrical rotatable housing, wherein the second 360° clockwise or counterclockwise rotation of the cylindrical rotatable housing is consecutive to the first 360° clockwise or counterclockwise rotation of the cylindrical rotatable housing;
  wherein, during the first working cycle, the rotary expander is configured to admit working fluid from the inlet port and expand the working fluid in the first working chamber to impart energy to the cylindrical rotatable housing, the cylindrical rotor, and the vane assembly from each of a forcing torque provided by the working fluid and a pressure of the working fluid, wherein the first working chamber is progressively enlarged as the working fluid expands, and wherein, during the second working cycle, the rotary expander is configured to discharge the expanded working fluid through an exhaust port.

6. A rotary compressor, comprising:
  a cylindrical rotatable housing with a cylindrical inner chamber that is defined by an inner cylindrical surface of the cylindrical rotatable housing;
  a cylindrical rotor that is placed within the cylindrical inner chamber and mounted eccentrically with respect to a center axis of the cylindrical rotatable housing, wherein the cylindrical rotor includes an outer cylindrical surface;
  a crescent shaped working volume that is formed between the inner cylindrical surface of the cylindrical rotatable housing and the outer cylindrical surface of the cylindrical rotor;
  a vane assembly, comprising one of the following:
    (i) a rocking arm connected to a circularly-arced portion, wherein the rocking arm is pivotally mounted via a first hinge to the cylindrical rotor and wherein the circularly-arced portion is pivotally mounted via a second hinge to the cylindrical rotatable housing, wherein the circularly-arced portion is configured to extend sealingly from a slot in the cylindrical rotor to periodically divide the crescent shaped working volume into a first working chamber and a second working chamber, wherein the cylindrical rotor is mounted within the cylindrical rotatable housing such that the outer cylindrical surface of the cylindrical rotor is always sealingly engaged with the inner cylindrical surface of the cylindrical rotatable housing at a common tangency point, or
    (ii) a rocking arm connected to a circularly-arced portion, wherein the rocking arm is pivotally mounted via a first hinge to the cylindrical rotatable housing and wherein the circularly-arced portion is pivotally mounted via a second hinge to the cylindrical rotor, wherein the circularly-arced portion is configured to extend sealingly from a slot in the cylindrical rotatable housing to periodically divide the crescent shaped working volume into a first working chamber and a second working chamber, wherein the cylindrical rotor is mounted within the cylindrical rotatable housing such that the outer cylindrical surface of the cylindrical rotor is always sealingly engaged with the inner cylindrical surface of the cylindrical rotatable housing at a common tangency point;
  an inlet port formed in the cylindrical rotatable housing for admitting a working fluid at an ambient pressure into the first working chamber; wherein the inlet port is positioned to prevent the working fluid from bypassing either the first working chamber or the second working chamber; and
  an outlet port equipped with a valve to regulate an exhaust time during which the working fluid is exhausted from the crescent shaped working volume to prevent the working fluid from bypassing either the first working chamber or the second working chamber, to prevent the working fluid from shortcutting the inlet and outlet ports, and to prevent the working fluid from entering back into the crescent shaped working volume from the outlet port.

7. The rotary compressor of claim 6, wherein a first working cycle is defined over an initial 360° clockwise or counterclockwise rotation of the cylindrical rotatable housing, the first working cycle beginning when the circularly-arced portion crosses the common tangency point, and wherein a second working cycle is defined by a subsequent 360° clockwise or counterclockwise rotation of the cylindrical rotatable housing and the cylindrical rotor, wherein, during the first working cycle, the rotary compressor is configured to admit a working fluid at an ambient pressure from the inlet port to the first working chamber over the entire duration of the first working cycle, and wherein, during the second working cycle, the rotary compressor is configured to compress the working fluid to a higher pressure in the second working chamber by continuously diminishing the size of the second working chamber and to discharge the compressed working fluid through the outlet port;
  wherein rotation of the cylindrical rotatable housing causes a periodic sequence of discharges of compressed working fluid from the outlet port and the sequence is defined by a driving torque applied to, and a circumferential speed of, the cylindrical rotatable housing.

8. The rotary compressor of claim 6, wherein the valve comprises one of a check-valve or a rotating valve that is operationally synchronized with the cylindrical rotatable housing speed either mechanically or electrically.

9. A nested multistage rotary comprising:
  an outer rotary expander and an inner rotary expander radially nested within the outer rotary expander such that an output of the inner rotary expander is an input of the outer rotary expander;
  wherein the outer rotary expander comprises:
    a cylindrical rotatable housing with a cylindrical inner chamber that is defined by an inner cylindrical surface of the cylindrical rotatable housing;

a cylindrical middle ring that is placed within the cylindrical inner chamber and mounted eccentrically with respect to a center axis of the cylindrical rotatable housing, wherein the cylindrical middle ring includes an inner cylindrical surface and an outer cylindrical surface;

an outer crescent shaped working volume that is formed between the inner cylindrical surface of the cylindrical rotatable housing and the outer cylindrical surface of the cylindrical middle ring; and an outer vane assembly comprising a first circularly-arced portion that is pivotally mounted via respective hinges to each of the cylindrical rotatable housing and the cylindrical middle ring and configured to extend sealingly from a slot in the cylindrical rotatable housing to periodically divide the outer crescent shaped working volume into a first working chamber and a second working chamber, wherein the cylindrical middle ring is mounted within the cylindrical rotatable housing such that the inner cylindrical surface of the cylindrical rotatable housing is always sealingly engaged with the outer cylindrical surface of the cylindrical middle ring at a first common tangency point without any sliding frictional contact;

an outer inlet port for the outer crescent shaped working volume that is located on the cylindrical middle ring, wherein the outer inlet port is configured to admit working fluid received from the inner rotary expander to the outer crescent shaped working volume;

wherein the inner rotary expander comprises:

a cylindrical rotor that is placed within the cylindrical middle ring and mounted eccentrically with respect to a center axis of the cylindrical middle ring, wherein the cylindrical rotor includes an outer cylindrical surface;

an inner crescent shaped working volume that is formed between the inner cylindrical surface of the cylindrical middle ring and the outer cylindrical surface of the cylindrical rotor;

an inner vane assembly, comprising a second circularly-arced portion that is pivotally mounted via respective hinges to each of the cylindrical rotor and the cylindrical middle ring and configured to extend sealingly from a slot in the cylindrical rotor to periodically divide the inner crescent shaped working volume into a third working chamber and a fourth working chamber, wherein the cylindrical rotor is mounted within the cylindrical middle ring such that the outer cylindrical surface of the cylindrical rotor is always sealingly engaged with the inner cylindrical surface of the cylindrical middle ring at a second common tangency point without any sliding frictional contact; and an inner inlet port connecting the inner crescent shaped working volume to an inlet tube running through a center axis of the cylindrical rotor, wherein the inner inlet port is configured to admit a working fluid into the inner crescent shaped working volume;

wherein the inner crescent shaped working volume is in fluid communication with the outer inlet port of the outer rotary expander to provide working fluid from the inner crescent shaped working volume to the outer inlet port; and wherein the nested multistage rotary expander further comprises:

an outlet port for working fluid to exit the nested multistage rotary expander;

wherein both the outer inlet port and the inner inlet port are configured to admit working fluid into the respective periodically defined first, second, third, and fourth working chambers, and wherein the working fluid is expanded and expulsed from the outlet port in alternating full rotations of the cylindrical rotatable housing, the cylindrical middle ring, and the outer vane assembly in response to expansion of the working fluid in the first and second working chambers.

10. The nested multistage rotary expander of claim 9, wherein an initial working cycle is defined over a 360° clockwise rotation of the cylindrical middle ring, wherein a subsequent working cycle is initiated every time the second circularly-arced portion of the inner vane assembly crosses the second common tangency point;

wherein, during the initial working cycle, the nested multistage expander is configured to admit working fluid into the third working chamber from the inner inlet port to fill the third working chamber and expand the admitted working fluid, wherein the working fluid admitted to the third working chamber imparts energy to, during expansion of the admitted working fluid, the cylindrical middle ring, the cylindrical rotor, and the inner vane assembly, whereby the third working chamber is progressively enlarged to the size of the inner crescent shaped working volume.

11. The nested multistage rotary expander of claim 9, wherein an initial working cycle is defined over a 360° clockwise rotation of the cylindrical rotatable housing and a subsequent working cycle is initiated every time the first circularly-arced portion of the outer vane assembly crosses the first common tangency point;

wherein, during the initial working cycle, the nested multistage expander is configured to admit working fluid into the first working chamber from the fourth working chamber to impart energy to, during expansion of the working fluid admitted to the first working chamber, the cylindrical rotatable housing, the cylindrical middle ring, and the outer vane assembly whereby the first working chamber is progressively enlarged to the size of the outer crescent shaped working volume.

12. The nested multistage rotary expander of claim 11, wherein a second working cycle is defined over a consecutive 360° clockwise rotation following the initial working cycle, wherein, during the second working cycle, the nested multistage rotary expander is configured to direct expanded working fluid to the second working chamber and to discharge the expanded working fluid through the outlet port.

13. The nested multistage rotary expander of claim 9, further comprising a plurality of side plates configured and arranged to hermetically seal the inner crescent shaped working volume and the outer crescent shaped working volume to prevent working fluid from leaking from the inner crescent shaped working volume and the outer crescent shaped working volume.

14. The nested multistage rotary expander of claim 9, wherein the cylindrical rotatable housing, the cylindrical middle ring, and the cylindrical rotor have different tangential velocities.

15. The nested multistage rotary expander of claim 9, wherein the inner vane assembly partitions the working fluid into sequential batches of working fluid.

16. A nested multistage rotary compressor comprising:
an outer rotary compressor and an inner rotary compressor radially nested within the outer rotary compressor such that an output of the outer rotary compressor is an input of the inner rotary compressor;
wherein the outer rotary compressor comprises:
a cylindrical rotatable housing with a cylindrical inner chamber that is defined by an inner cylindrical surface of the cylindrical rotatable housing;
a cylindrical middle ring that is placed within the cylindrical inner chamber and mounted eccentrically with respect to a center axis of the cylindrical rotatable housing, wherein the cylindrical middle ring includes an inner cylindrical surface and an outer cylindrical surface;
an outer crescent shaped working volume that is formed between the inner cylindrical surface of the cylindrical rotatable housing and the outer cylindrical surface of the cylindrical middle ring;
an outer vane assembly comprising a first circularly-arced portion that is pivotally mounted via respective hinges to each of the cylindrical rotatable housing and the cylindrical middle ring and configured to extend sealingly from a slot in the cylindrical rotatable housing to periodically divide the outer crescent shaped working volume into a first working chamber and a second working chamber, wherein the cylindrical middle ring is mounted within the cylindrical rotatable housing such that the inner cylindrical surface of the cylindrical rotatable housing is always sealingly engaged with the outer cylindrical surface of the cylindrical middle ring at a first common tangency point without any sliding frictional contact;
an inlet port configured to admit a working fluid to the outer crescent shaped working volume; and
an outlet port configured to provide compressed working fluid to the inner rotary compressor;
wherein the inner rotary compressor comprises:
a cylindrical rotor that is placed within the cylindrical middle ring and mounted eccentrically with respect to a center axis of the cylindrical middle ring, wherein the cylindrical rotor includes an outer cylindrical surface;
an inner crescent shaped working volume that is formed the inner cylindrical surface of the cylindrical middle ring and the outer cylindrical surface of the cylindrical rotor;
an inner vane assembly, comprising a second circularly arced portion that is pivotally mounted via respective hinges to each of the cylindrical rotor and the cylindrical middle ring and configured to extend sealingly from a slot in the cylindrical rotor to periodically divide the inner crescent shaped working volume into a third working chamber and a fourth working chamber, wherein the cylindrical rotor is mounted within the cylindrical middle ring such that the outer cylindrical surface of the cylindrical rotor is always sealingly engaged with the inner cylindrical surface of the cylindrical middle ring at a second common tangency point without any sliding frictional contact;
wherein the nested multistage rotary compressor further comprises:
an exhaust port connecting the inner crescent shaped working volume to an outlet tube running through the center axis of the cylindrical rotor, wherein the exhaust port is configured to discharge working fluid from the inner rotary compressor with each rotation of the cylindrical middle ring, the cylindrical rotor, and the inner crescent shaped working volume in response to an input driving torque to the inner rotary compressor and a circumferential speed of the cylindrical rotatable housing;
wherein an initial working cycle is defined over a 360° counter-clockwise rotation of the cylindrical rotatable housing and a subsequent working cycle is defined over a 360° counter-clockwise rotation of the cylindrical middle ring and the cylindrical rotor, wherein the initial working cycle begins when the first circularly-arced portion crosses the first common tangency point, wherein, during the initial working cycle, the nested multistage rotary compressor is configured to admit working fluid at ambient pressure from the inlet port during the entire initial working cycle, wherein, during the subsequent working cycle, the nested multistage rotary compressor is configured to compress the working fluid to a higher pressure in the second working chamber by continuously diminishing the volume of the second working chamber and to discharge the compressed working fluid through the outlet port from the outer rotary compressor to the inner rotary compressor; and wherein, during the subsequent working cycle, the nested multistage rotary compressor is configured to further compress the working fluid in the third and fourth working chambers and to discharge the further compressed working fluid through the exhaust port.

17. The nested multistage rotary compressor of claim 16, wherein the cylindrical rotatable housing is rotatable 360° around the center axis of the cylindrical rotatable housing.

18. The nested multistage rotary compressor of claim 17, wherein the cylindrical middle ring is rotatable 360° around the center axis of the cylindrical middle ring.

19. The nested multistage rotary compressor of claim 18, wherein the cylindrical rotor is rotatable 360° around a fixed center axis of the cylindrical rotor.

20. The nested multistage rotary compressor of claim 19, wherein the center axis of the cylindrical middle ring is located closer to the center axis of the cylindrical rotatable housing than the fixed center axis of the cylindrical rotor.

* * * * *

UNITED STATES PATENT AND TRADEMARK OFFICE
CERTIFICATE OF CORRECTION

PATENT NO. : 10,309,222 B2
APPLICATION NO. : 14/933906
DATED : June 4, 2019
INVENTOR(S) : Ibrahim Sinan Akmandor Page 1 of 1

It is certified that error appears in the above-identified patent and that said Letters Patent is hereby corrected as shown below:

On the Title Page

In Column 1, at item (73):
The Assignee which reads "PARS MAINA SANAYI VE TICARET LIMITED SIRKETI" should read --PARS MAKINA SANAYI VE TICARET LIMITED SIRKETI--.

Signed and Sealed this
Seventeenth Day of September, 2019

Andrei Iancu
*Director of the United States Patent and Trademark Office*